United States Patent [19]
Shikunami

[11] Patent Number: 5,276,664
[45] Date of Patent: Jan. 4, 1994

[54] BINARIZATION APPARATUS FOR REPRODUCED SIGNAL IN REPRODUCTION APPARATUS OF OPTICAL DISC

[75] Inventor: Juichi Shikunami, Kanagawa, Japan

[73] Assignee: Victor Company of Japan, Ltd., Yokohama, Japan

[21] Appl. No.: 783,025

[22] Filed: Oct. 25, 1991

[30] Foreign Application Priority Data

Oct. 26, 1990 [JP] Japan .................................. 2-289816

[51] Int. Cl.⁵ .................... G11B 7/00; H03K 5/153
[52] U.S. Cl. ............................. 369/54; 369/48; 369/59; 307/359; 307/265
[58] Field of Search ............... 369/124, 59, 48, 47, 369/54, 32, 58; 307/358, 359, 265

[56] References Cited
U.S. PATENT DOCUMENTS

| | | | |
|---|---|---|---|
| 4,646,103 | 2/1987 | Sugiyama et al. | 369/54 |
| 4,731,773 | 3/1988 | Lewkowicz | 369/59 |
| 4,788,674 | 11/1988 | Maeda et al. | 369/124 |
| 5,008,669 | 4/1991 | Ishibashi et al. | 369/124 |
| 5,111,443 | 5/1992 | Yokogawa | 369/59 |

Primary Examiner—Aristotelis Psitos
Assistant Examiner—Nabil Hindi
Attorney, Agent, or Firm—Lowe, Price, LeBlanc & Becker

[57] ABSTRACT

A reproducing apparatus for reproducing plural types of optical discs comprising: a comparator for digitizing a reproduced signal obtained by reproduction of a first optical disc which is to be reproduced under a first optical condition defined by a first reproducing reference under a second optical condition defined by a second reproducing reference applied to reproduction of a second optical disc having a recording density higher than that of the first optical disc, the comparing operation of the reproduced signal with a reference voltage different from that defined by the first reproducing reference; and a pulse length correction circuit for correcting a pulse length of a digital signal outputted from the comparator such that the pulse length of the digital signal is equal to another pulse length which would be obtained by digitizing another reproduced signal using the reference voltage defined by the first reproducing reference, the another reproduce signal being obtained by reproducing the first optical disc in accordance with the first reproducing reference.

4 Claims, 2 Drawing Sheets

BINARIZATION APPARATUS FOR REPRODUCED SIGNAL IN REPRODUCTION APPARATUS OF OPTICAL DISC

BACKGROUND OF THE INVENTION

1. Field of the Invention

This invention relates to a reproducing apparatus for plural types of optical discs whose recording densities are different from each other.

2. Description of the Prior Art

When information is recorded on an information recording medium as a digital data, recording is carried out such that the digital signal indicative of the information is modulated as digital data by a specific modulation method selected from various types of modulating methods. In this respect, if the information recording medium is an optical disc, the situation is the same as that of the above-mentioned case. For, example, in an optical disc which is known as a compact disc (CD), recording and reproducing are carried out by modulation using a modulation method (EFM) such that eight data bits are enlarged to fourteen channel bits. In the CD for which the above-mentioned EFM is adopted, digital data is formed on the surface of the CD by a bit train of a modulated signal including nine types of bit lengths which are successively set to either one between the modulated signal of bit length (pulse length or pulse width) 3 T corresponding to the minimum interval Tmin between bits and a bit length of 11 T corresponding to the maximum interval Tmax between bits.

In the above-mentioned recording/reproducing method, digital data including nine types of bit lengths which are successively set to either one between the modulated signal of the shortest bit length 3 T and a longest bit length of 11 T is recorded on the optical disc (CD) as an array of pits. Reproducing (reading out) the information recorded in accordance with the condition of pits arranged on the CD is carried out by projecting and focusing a reproducing light beam (read out light) having a specific wavelength 870 nm) on a CD through a condenser lens (objective lens) with a specific numerical aperture (NA=0.45). When the recorded information from the above-mentioned CD is reproduced, the reproducing light is projected on the array of pits provided on the signal plane of the CD such that a portion of a beam waist of the reproducing light condensed by the condenser lens positions on a signal plane of the CD, i.e., the signal plane of the CD positions at a focus point of the condenser lens. In -this condition, a reproduced signal is obtained by photoelectric conversion of the reproduced light, reflected and diffracted from the signal plane of the CD in this condition.

The above-mentioned reproduced signal, i.e., the reproduced signal obtained in the condition that a light spot having a given diameter is focused onto the signal plane of the CD so positioned at the focus point of the condenser lens, is supplied to a comparator to which a voltage value which is about half of an amplitude of the reproduced signal is applied as a comparator reference voltage (threshold voltage) in order to perform demodulation operation. This causes demodulation of digital data which comprises the bit train of a modulated signal including nine types of bit lengths which are successively set to either one between the modulated signal of bit length (pulse length or pulse width) 3 T corresponding to the minimum interval Tmin between bits and a bit length of 11 T corresponding to the maximum interval Tmax between bits.

Then, to demodulate, with high fidelity, the digital data recorded in the condition that various conditions specified in the specification of the CD are satisfied, it is necessary for demodulation that: as mentioned above, the reproducing light (read out light) having a specific wavelength (780 nm) through -a condenser lens (objective lens) with a specific numerical aperture (NA=0.45) is focused on a CD; and the reproducing light is projected and focused on the array of pits provided on the signal plane of the CD such that a portion of a beam waist of the reproducing light condensed by a condenser lens positions on a signal plane of the CD, in other words, the signal plane of the CD positions at a focus point of the condenser lens. In this condition, in order to demodulate, the reproduced signal obtained from a photodetector is applied to the comparator to which the voltage value which is about half of an amplitude of the reproduced signal is applied. For example, if the wavelength of the reproducing light or the numerical aperture of the condenser lens used in the reproduction apparatus deviates from the values specified in the specification of the CD or a voltage value of the reference voltage (threshold voltage) of the comparator used for demodulation of the reproduction signal deviates over the tolerance from the voltage value which is about half of the amplitude of the reproduce signal, it may be happen that the digital data comprising the bit train of the modulated signal including nine types of bit lengths which are successively set between the modulated signal of bit length (pulse length or pulse width) 3 T corresponding to the minimum interval Tmin between bits and a bit length of 11 T corresponding to the maximum interval Tmax between bits, cannot be demodulated correctly. Thus, for example, the modulated signal of 3 T bit length corresponding the shortest interval Tmin between bits, which is recorded on the CD may be demodulated as a modulated signal having a bit length other than a bit length of 3 T.

In the reproducing apparatus of the CD, as the modulated signal of the bit length of 3 T corresponding to the shortest interval Tmin between bits should be demodulated as a demodulated signal of 3 T bit length for example, in order to obtain the demodulated signal having the same bit length as that recorded on the CD. Thus, the reproducing light beam (read out light) having the specific wavelength (780 nm) through a condenser lens with the specific numerical aperture (NA=0.45) is focused on a CD; a reproduced signal is obtained in the condition that a light spot with a given diameter is focused on the array of pits provided on the signal plane of the CD; and the reproduced signal is applied to the comparator to which a voltage value (threshold voltage) which is about half of an amplitude of the reproduced signal is applied in order to perform demodulation operation.

Then, in order to correctly demodulate the modulated signal recorded on the optical disc on which information is recorded as the array of pits formed on the signal plane of the optical disc, as clearly described in the above description of the CD mentioned as an example, it is necessary that the diameter of spot of the reproducing light to be used on reproducing of the information signal recorded on the optical disc ranges in the specific values specified in correspondence with the size and form of the pit; and that the comparator reference voltage (threshold voltage) used for demodulating the reproduced signal is the voltage value of about half of the amplitude of the reproduced signal, etc.

For the reasons mentioned above, as a reproducing apparatus for plural types of optical discs capable of correct demodulation of the information signal recorded on plural types of optical discs having different recording densities, the reproducing apparatus needs different structures in either or both of a light source of the reproducing light and the condenser lens used, that is, such reproducing apparatus requires different optical heads having light sources of the reproducing light capable of emitting light having different wavelengths and condenser lenses having different numerical apertures respectively.

Then, put the above-mentioned point will be more specifically as follows:

Because the size of the pit formed on the signal plane of the optical disc becomes smaller with the higher the recording density generally in the case that the recording density is increased but the rotational speed of the optical disc is remained constant, in the reproducing apparatus for obtaining the reproduced signal using diffraction phenomenon of the reproducing light reflected at pits by projecting and focusing the reproducing light onto the signal plane, the spot of the reproducing light having a diameter with a given relation according to an width of the pit in the radial direction of the optical disc to be reproduced is projected and focused onto the signal plane of the optical disc.

Moreover, conditions of array of pits formed on the signal plane of the optical disc are different from each other in accordance with the recording density of the optical disc though recording/reproducing is performed for modulation of digital data by the same modulating method for example. In the case that optical discs having different recording densities are used and driven at different rotational speeds, the pit of an optical disc having a higher recording density has pits whose width is smaller than that of an optical disc having a lower recording density. As mentioned, conditions of pit arrays formed on the signal planes of optical discs are different from each other with recording densities of optical discs.

Then, because the condition of the light diffraction at the pit portion is totally different naturally if pits are read out with the spot having the same wavelength and the same diameter in the case that the sizes of pits of optical discs are different with each other, it is clear that the reproduced signals outputted from the photodetectors are different from each other.

In order to resolve the above-mentioned problem that the diffraction state of light produced by pits changes with change in relation between the width of the pit and the diameter of the spot used for reading out the pit, it may be considered that a cross-sectional area of the reproducing light on the signal plane of the optical disc is changed with change in condition of condensing of the reproducing light. However, wave front of the reproducing light at the signal plane of the optical disc is disturbed because a cross section of the reproducing light projected onto the signal plane of the optical disc is not the beam waist portion. Therefore, though cross section of the reproducing light at the signal plane of the optical disc is changed in accordance with the above-mentioned resolution method, that is, though the diameter of the reproducing light at the signal plane of the optical disc is formed to have the specific diameter, the reproduced signal cannot be reproduced correctly from the optical disc. Therefore, as a reproducing apparatus for producing plural types of optical discs capable of correct demodulation of the information signal recorded on plural optical discs having different recording densities, the reproducing apparatus needs different read heads in either or both of a light source of the reproducing light and the condenser lens used in the structure of the reproducing apparatus.

However, because it is undesirable that in one reproducing apparatus, different read heads are provided for respective types of optical discs having different recording densities, it was considered that a reproducing apparatus used for an optical disc, having a specification that a diameter of a spot of the reproduced light projected on the signal plane of the optical disc in focus on reproducing is smallest was tried to be used for reproducing other type optical discs in common.

However, it is obvious that a correctly demodulated signal cannot be obtained though the voltage value of about half of the amplitude of the reproduce signal as the comparator reference voltage (threshold voltage) on demodulation of the reproduced signal is used unless a spot of the reproducing light having a diameter with a given relation according to an width of the pit on the optical disc is projected onto the signal plane of the optical disc in the reproducing apparatus for obtaining a reproduced signal using diffraction phenomenon of reproducing light coming from pits by projecting the reproducing light onto the signal plane. Further, there is also a problem that it is possible that the comparator reference voltage (threshold voltage) cannot be set which is necessary for demodulation of the reproduced signal to obtain a correct demodulated signal. Therefore, a resolution to these problems is required.

The above-mentioned point will be described more specifically. It is assumed that one of plural optical discs having different recording densities is a CD wherein reproducing light of 780 nm wavelength and a condenser lens of 0.45 numerical aperture as mentioned above are used. Also it is assumed that another optical disc capable of higher recording density than the CD is reproduced using light of 670 nm wavelength as reproducing light and a condenser lens of 0.50 numerical aperture. When a reproducing apparatus using the reproducing light of 670 nm wavelength and the condenser lens of 0.50 numerical aperture, i.e., a reproducing apparatus for reproducing the optical disc having a recording density which is higher than that of the CD reproduces a CD, the reproduced signal from the reproducing apparatus has an eye pattern shown in FIG. 5.

Then, in the case that the reproduced signal as shown in FIG. 5 is supplied to the comparator to which the voltage value of about half of the amplitude of the reproduced signal as a comparator reference voltage (threshold voltage) for demodulation operation, that is, in the case that a comparator reference signal (threshold voltage) of the line S—S shown in FIG. 5 is used to demodulate, the digital data comprising the bit train of the modulated signal including nine types of bit lengths which are successively set to either one between the modulated signal of bit length (pulse length or pulse width) 3 T corresponding to the minimum interval Tmin between bits and a bit length of 11 T corresponding to the maximum interval Tmax between bits, cannot be demodulated correctly. In FIG. 5, a comparator reference voltage (threshold voltage) capable of correct demodulation of the digital data comprising the bit train of the modulated signal including nine types of bit lengths which are successively set to either one between the modulated signal of bit length (pulse length or pulse width) 3 T corresponding to the minimum interval Tmin between bits and a bit length of 11 T corresponding to the maximum interval Tmax between bits is a voltage shown by the line A—A in FIG. 5 when the reproduced signal is that one shown in FIG. 5. As clearly shown by the waveform of the reproduced signal in FIG. 5, a stable demodulated signal cannot be obtained at the line A—A. Therefore, the reproducing apparatus used for the optical disc defined by a specification such that a diameter of the reproducing light projected onto the signal plane of the optical disc in focus in the reproducing modes smallest cannot be used for other types of optical discs having different recording densities in common.

SUMMARY OF THE INVENTION

The present invention has been developed in order to remove the above-described drawbacks inherent to the conventional reproducing apparatus for reproducing plural types of optical discs.

According to this invention there is provided a reproducing apparatus for reproducing plural types of optical information recording medium discs comprising: a digital signal generation circuit for digitizing a reproduced signal obtained by reproduction of a first optical information recording medium disc which is to be reproduced under a first optical condition determined by the first reproducing reference, under a second optical condition determined by a second reproducing reference which is applied to reproduction of a second optical information recording medium disc having a recording density higher than that of the first optical information recording medium disc, the digitizing being carried out by comparing the reproduced signal with a comparator reference voltage which is different from that determined by the first reproducing reference; and a pulse length correction circuit for correcting a pulse length of a digital signal outputted from the digital signal generation circuit such that the pulse length of the digital signal is equal to another pulse length which would be obtained by digitizing another reproduced signal using the comparator reference voltage determined by the first reproducing reference, the another reproduce signal being obtained by reproduction of the first optical information recording medium disc to be reproduced in accordance with the first reproducing reference.

A digital signal is generated by comparing the reproduced signal by the comparator to which the comparator reference voltage is applied, the comparator reference voltage being is different from that determined by a first reproducing reference, the reproduced signal being obtained by reproducing a first optical information recording medium disc, which is to be reproduced under the first reproducing reference under a second optical reproducing condition determined by a second reproducing reference which is applied to reproduction of a second optical information recording medium disc having a recording density higher than that of the first optical information recording medium disc.

A pulse length of the digital signal generated as mentioned above is so corrected to have a regular pulse length of the digital signal by the pulse length correction circuit because the pulse length of the reproduce signal reproduced under the first reproducing reference mentioned above is different from another pulse length which would be obtained by digitizing the regular reproduced signal using the comparator reference voltage determined by the first reproducing reference.

According to this invention there is also provided a reproducing apparatus for reproducing plural types of an optical information recording medium discs comprising: a digital signal generation circuit for digitizing a reproduced signal obtained by reproduction of a first optical information recording medium disc which is to be reproduced under a first optical condition, under a second optical condition defined by a second reproducing reference which is applied to reproduction of a second optical information recording medium disc having a recording density higher than that of the first optical information recording medium disc, the digitizing being carried out by comparing the reproduced signal with a comparator reference voltage which is different from that determined by the first reproducing reference, the digital signal generation circuit having a feedback circuit for generating the comparator reference voltage so as to produce the digital signal whose pulse length of an up-going pulse is made longer and whose pulse length of a down-going pulse is made shorter by an interval of N (N is a natural number more than one) channel bits or to produce the digital signal whose pulse length of the up-going pulse is made shorter and whose pulse length of the down-going pulse is made longer by the interval of N channel bits; and a pulse length correction circuit for correcting a pulse length of a digital signal outputted from the digital signal generation circuit by a length of N (N is a natural number more than one) channel bits.

In the case that the digital signal is obtained by application of the reproduced signal obtained by reproduction of a first optical disc which is to be reproduced under the first reproducing reference under an optical condition determined by a second reproducing condition which is applied to reproduction of another optical disc having a recording density higher than that of the first optical information recording medium disc, the digital signal of a regular pulse length is outputted from the comparator by feeding back the digital signal outputted at the comparator through the pulse length correction circuit and the feedback circuit as a comparator reference voltage of the comparator so that the pulse length of the digital signal is equal to another pulse length which would be obtained by digitizing another reproduced signal using the comparator reference voltage determined by the first reproducing reference, the another reproduce signal being obtained by reproducing the first optical information recording medium disc in accordance with the first reproducing reference.

According to the invention there is further provided a reproducing apparatus for reproducing plural types of optical information recording medium discs characterized in that:

a reproduced signal is applied to a digital signal generation circuit, the reproduced signal being obtained by reproduction of a first optical information recording medium disc which is to be reproduced under the first reproducing reference under an optical condition determined by a second reproducing condition which is applied to reproduction of a second optical information recording medium disc having a recording density higher than that of the first optical information recording medium disc; and that a comparator reference voltage is fed back to the digital signal generation circuit which is used for digitizing as a reference voltage through a pulse length correction circuit and a feedback circuit in order that a pulse length of the digital signal outputted from the digital signal generation circuit is equal to another pulse length which would be obtained by digitizing another reproduced signal using the comparator reference voltage determined by the first reproducing reference, the another reproduce signal being obtained by reproducing the first optical information recording medium disc in accordance with the first reproducing reference.

The digital signal is generated by comparing the reproduced signal with the comparator reference voltage which is different from that determined by a first reproducing reference, the reproduced signal being obtained by reproducing a first optical information recording medium disc which is to be reproduced under the first reproducing reference under the optical reproducing condition determined by a second reproducing reference which is applied to reproduction of second optical information recording medium disc having a recording density higher than the first optical information recording medium disc.

According to this invention there is further provided a reproducing apparatus for reproducing plural types of optical information recording medium discs comprising: a digital signal generation circuit for digitizing a reproduced signal obtained by reproduction of a first optical information recording medium disc which is to be reproduced under an optical condition determined by a first reproducing reference under a second optical condition defined by a second reproducing reference which is applied to reproduction of a second optical information recording medium disc having a recording density higher than that of the first optical information recording medium disc, the digitizing being carried out by comparing the reproduced signal with a comparator reference voltage which is different from that determined by the first reproducing reference; and a digital demodulation conversion table whose conversion is performed such that bit shift is made by D (D is a positive real number) channel bits compared with conversion of another digital demodulation conversion table which would be provided to the reproducing apparatus of the first optical information recording medium disc in the case that a pulse length of a digital signal outputted from digital signal generation circuit is shifted by D (D is a positive real number) channel bits compared with a regular digital signal obtained from the digital signal generation circuit which digitizes another reproduced signal using the comparator reference voltage determined by the first reproducing reference, the another reproduce signal being obtained by reproducing of the first optical information recording medium disc to be reproduced under the first reproducing reference.

In the case that a pulse length of the digital signal generated as mentioned above is shifted by D (D is a positive real number) channel bits compared with a regular digital signal which would be obtained by the comparator to which the comparator reference voltage determined by the first reproducing reference is applied and the reproduced signals is obtained by reproducing of the first optical disc to be reproduced under the first reproducing reference under the optical condition determined by the second reproducing reference, the digital signal is converted by the digital demodulation converting table whose conversion is performed such that the pulse length of the digital signal is shifted by D (D is a positive real number) channel bits compared with the conversion condition of the digital demodulation conversion table provided to the reproducing apparatus of the optical disc.

BRIEF DESCRIPTION OF THE DRAWINGS

The object and features of the present invention will become more readily apparent from the following detailed description taken in conjunction with the accompanying drawings in which.

The same or corresponding elements or parts are designated as like reference throughout the drawings.

DETAILED DESCRIPTION OF THE INVENTION

Hereinbelow will be described a first embodiment of this invention.

Figure 1:
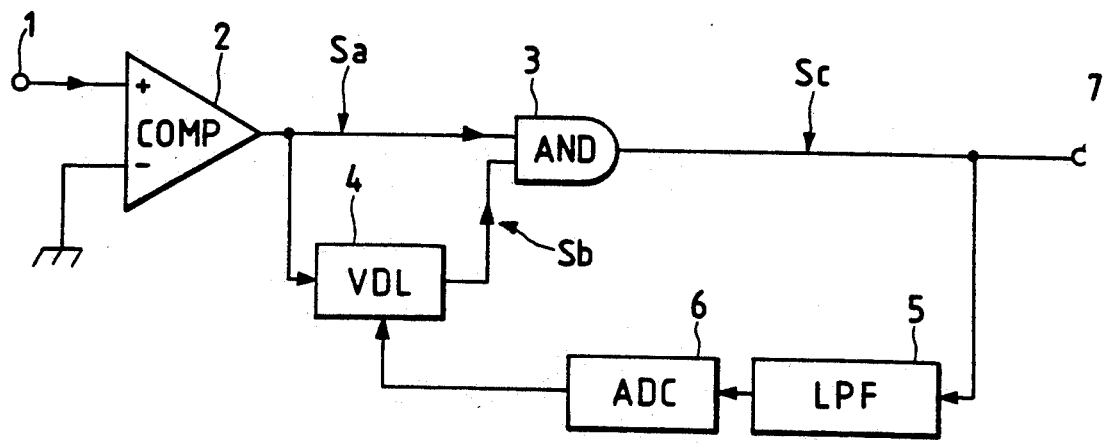
FIG. 1 is a block diagram of the first embodiment of the reproducing apparatus for reproducing plural types of optical information recording medium discs of the invention.
Figure 2:
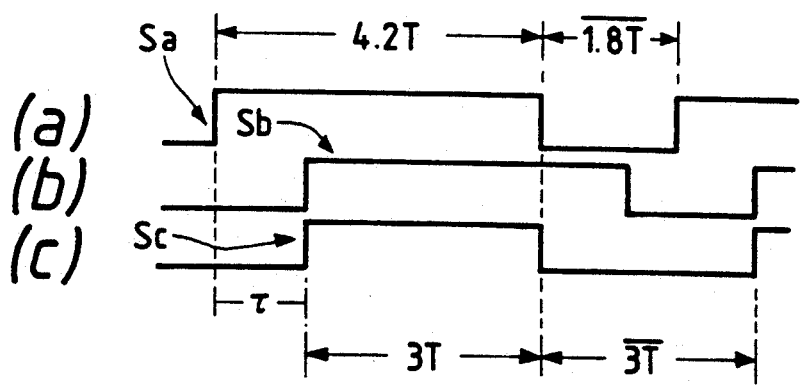
FIG. 2(a-c) shows waveforms for illustrating operation of the reproducing apparatus of the invention.

FIG. 1 is a block diagram of the first embodiment of the reproducing apparatus for reproducing plural types of optical information recording medium discs of the invention. FIG. 2 shows waveforms for illustrating its operation.

Recording of digital data in an optical disc for which EFM (Eight to Fourteen Modulation) is adapted as a modulation method is carried out by forming of pit arrays according to a modulated signal including nine types of bit lengths which are set successively to either one between the modulated signal of bit length (pulse length or pulse width) 3 T corresponding to the minimum interval Tmin between bits and a bit length of 11 T corresponding to the maximum interval Tmax between bits, wherein T is a cell length of channel bit. When the above-mentioned optical disc is a CD, reproducing (reading out) of the recorded information on the CD is carried out using an optical system comprising a condenser lens (objective lens) of 0.45 numerical aperture for reproducing light of 780 nm wavelength. A reproduced signal obtained by the optical system or optical head (not shown) including a photodetector (not shown) is applied to a comparator to which a comparator reference voltage (threshold voltage) of about half of an amplitude of the reproduced signal is applied. This enables correct reproducing of the digital data comprising the bit train of the modulated signal including nine types of bit lengths which are successively set to either one between the modulated signal of bit length (pulse length or pulse width) 3 T of the minimum interval and a bit length of 11 T of the maximum interval. In addition to this, when the reproduction of the CD is carried out by the reproducing apparatus so built up that a light spot projected and focused onto a signal plane of an optical disc has a diameter smaller than that projected onto the signal plane of the CD in order to be suited for reproduction of an optical disc with a recording density higher than that of the above-mentioned CD, the digital data comprising the bit train of the modulated signal including nine types of bit lengths which are successively set to either one between the modulated signal of bit length (pulse length or pulse width) 3 T of the minimum interval and a bit length of 11 T of the maximum interval cannot be correctly reproduced though the reproduced signal is applied to the comparator to which the comparator reference voltage (threshold voltage) of about half of an amplitude of the reproduced signal is applied as mentioned above.

The reproducing apparatus for reproducing plural types of optical information recording medium discs of the invention has a structure such that: reproducing operation can be carried out in different optical reproducing conditions from a specific optical reproduction condition specified for reproducing an optical disc to be reproduced by the optical head; and that signal processing is so carried out that a correct digital signal is demodulated though reproduction is made in the different optical reproducing condition from a specific optical reproduction condition specified for reproducing the optical disc to be reproduced. This is similar to the above-mentioned case that a CD is reproduced by a reproducing apparatus having structure such that: a light spot projected onto a signal plane of an optical disc (not shown), whose diameter is smaller than that projected onto the signal plane of the CD.

In FIG. 1 showing a portion of circuit arrangement of the first embodiment of the invention, numeral 1 is an input terminal of the reproduced signal read out by the optical head (not shown) from the optical information recording medium disc (optical disc). It is assumed that the reproduced signal of the optical disc, supplied to the input terminal 1 of the above-mentioned reproduced signal is one from an optical disc, for example a CD, recording digital data modulated by the above-mentioned EFM, as well as it is a reproduced signal reproduced by the optical head (not shown) projecting a spot whose diameter is smaller than that projected and focused onto a signal plane of the CD originally used, for example, a signal showing an eye pattern as shown in FIG. 5.

As mentioned above, the reproduced signal supplied to the input terminal 1 from the optical head is supplied to a non-inverting input terminal of a comparator 2. An output signal Sa {refer to FIG. 2(a)} from the comparator, obtained by comparing it with a comparator reference voltage is supplied to a variable delay element 4 and an AND circuit 3.

Figure 5:
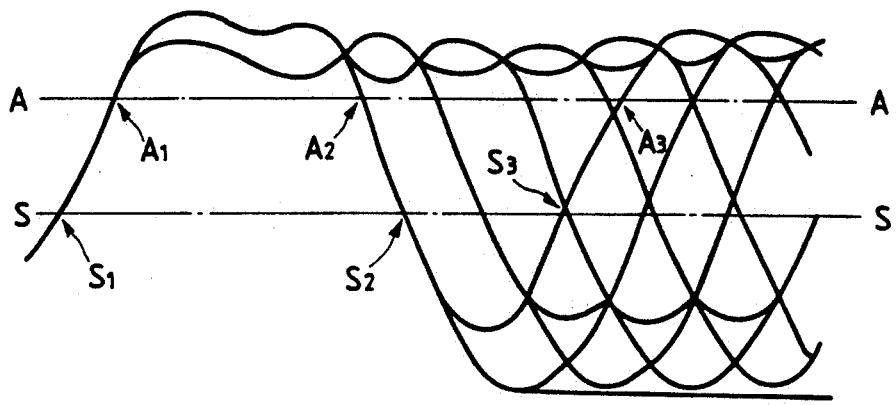
FIG. 5 shows the eye pattern of the reproduced signal inputted to the circuit arrangements of FIGS. 1, 3, 4.

In the embodiment shown in FIG. 1, in the case that the reproduced signal supplied to the input terminal 1 shown in FIG. 1 is an EFM signal showing the eye pattern shown in FIG. 5, the comparator 2 outputs an output signal Sa is provided at an output of the comparator 2 by comparing the reproduced signal shown in FIG. 5 with a ground potential shown by line S—S in FIG. 5. This is because the comparator reference voltage supplied to the non-inverting input terminal of the comparator is the ground potential.

Then, in the case that: the reproduced signal obtained in the condition that the light spot having the diameter specified by the specification of the CD is focused onto the signal plane of the CD, which is so placed at the focus plane of the condenser lens (not shown) provided to the optical head, is applied to the comparator 2 to which a voltage value of about half of the amplitude of the reproduced signal (a signal level of S—S in FIG. 5) is applied, the output signal Sa outputted from the comparator 2 in correspondence with the regular reproduced signal is made a signal of a correct bit train according a modulated signal including nine types of bit lengths which are successively set to either one between the modulated signal of bit length (pulse length or pulse width) 3 T of the minimum interval and a bit length of 11 T of the maximum interval. Because the reproduce signal supplied to the comparator 2 shown in FIG. 1 shows the eye pattern shown in FIG. 5, the output signal Sa outputted from the comparator to which the ground potential (the signal level S—S shown in FIG. 5) as the comparator reference voltage is supplied is as follows:

The modulated signal of bit length (pulse length or pulse width) 3 T corresponding to the shortest interval Tmin between bits appears as an up-going pulse corresponding to an interval from S1 to S2 as shown in FIG. 5. The modulated signal of bit length (pulse length or pulse width) 3 T-bar corresponding to the shortest interval Tmin between bits which follows the above-mentioned interval appears as a down-going pulse corresponding to an interval from S2 to S3 as shown in FIG. 5.

That is, in the case that the signal recorded on the CD is, for example, the modulated signal of 3 T pulse length and 3 T-bar pulse length modulated signal which are continuous in the time base, the reproduced signal shown in FIG. 5, that is, the original consecutive signal of modulated signal of 3 T pulse length above-mentioned and the modulated signal of pulse length of 3 T-bar is changed such that lengths of the reproduced signal around a signal level (S—S in FIG. 5) of about half of the amplitude of the reproduced signal are an interval of S1 to S2 (4.2 T) and an interval of S2 to S3 (1.8 T). It is a matter of course that as similar to the modulated signal whose pulse length is 3 T as mentioned above, the modulated signal of pulse length of 4 T to 11 T is changed to different length from the original pulse length 4 T to 11 T around the signal level (S—S in FIG. 5) of about half of the amplitude of the reproduced signal.

Then, when the reproduced signal showing the eye pattern shown in FIG. 5 is supplied to the comparator 2 in FIG. 1, the signal Sa including the up-going pulse of 4.2 T pulse length and a down-going pulse of 1.8 T pulse length as shown in FIG. 2(a) is outputted from the comparator 2.

Moreover, it is a matter of course that the reproduced signal changes with an optical reproduction condition applied to reproducing operation that the CD is reproduced by a reproducing apparatus using a spot whose diameter is smaller than that projected onto a signal plane of the CD which is conveniently used. Thus, the condition of the reproduced signal shown in FIG. 5 shows only an example.

Moreover, when a comparator reference voltage of the signal level shown by A—A in FIG. 5 is supplied to the comparator 2 to which the reproduced signal showing the eye pattern shown in FIG. 5 is supplied, the output signal Sa outputted at the output of the comparator 2 is such that: the modulated signal of 3 T bit length (pulse length or pulse width) corresponding to the shortest interval Tmin between bits appears as an up-going pulse corresponding to the interval from A1 to A2 in FIG. 5 and the consecutive the modulated signal of 3 T-bar bit length (pulse length or pulse width) corresponding to the shortest interval Tmin between bits as shown appears as a down-going pulse corresponding to the interval from A2 to A3 as shown in FIG. 5. Therefore, if comparison operation is carried out by supplying the comparator reference voltage of the signal level shown by line A—A in FIG. 5, the regular signal of 3 T and 3 T-bar pulse length is outputted from the comparator 2. The above-mentioned comparison operation by supplying the comparator reference voltage of the signal level shown by line A—A in FIG. 5 is astable such that the regular signal cannot be obtained by slightly change of a signal level of the reproduced signal. Thus, it is improper that the demodulated signal is obtained by the comparison operation using the comparator reference voltage of the signal level shown by A—A in FIG. 5.

Then, when the reproduced signal showing the eye pattern shown in FIG. 5 is supplied to the comparator 2 shown in FIG. 1 to which the ground level is supplied, the signal Sa including the up-going pulse of 4.2 T pulse length and the down-going pulse of 1.8 T pulse length as shown in FIG. 2(a) is outputted from the comparator 2 in the condition such that the modulated signal of 3 T pulse length and the modulated signal of 3 T-bar pulse length which has been recorded on the CD are changed in pulse length respectively.

Then, when the signal recorded on the CD is different from the modulated signal of 3 T pulse length and the modulated signal of 3 T-bar pulse length recorded on the CD, that is, for example, the output signal Sa including the up-going pulse of 4.2 T pulse length and the down-going pulse of 1.8 T pulse length outputted from the comparator 2 is supplied to a pulse length correction circuit comprising the variable delay element 4 and the AND circuit 3 as mentioned above, the modulated signal of 3 T pulse length and the modulated signal of 3 T-bar pulse length originally recorded on the CD is outputted from the output terminal 7 from the AND circuit 3.

That is, when the output signal Sa including an up-going pulse of 4.2 T pulse length and the down-going pulse of 1.8 T pulse length converted from the modulated signal of 3 T pulse length and the modulated signal of 3 T-bar pulse length originally recorded on the CD, is outputted from the comparator 2 and is supplied to the variable delay element 4 and the AND circuit 3, the variable delay element 4 produces a signal Sb shown in FIG. 2 to have a given time delay τ to the supplied signal Sa and supplies it to the AND circuit 3. The AND circuit 3 outputs a signal Sc corresponding to logical AND between the output signal Sa of the comparator 2 and the signal Sb delayed by the given interval τ as shown in FIG. 2.

Now, the delay time τ in the variable delay element 4 can be set to 1.2 T, in the case that the output signal Sa is obtained as the demodulated signal including the up-going pulse of 4.2 T pulse length and the down-going pulse of 1.8 T pulse length converted from the modulated signal of 3 T pulse length and the modulated signal of 3 T-bar pulse length recorded on the CD. That is, when the output signal Sa outputted from the comparator 2 to which the comparator reference voltage shown by S—S in FIG. 5 and the reproduced signal showing the eye pattern shown in FIG. 5 are supplied, the delay time τ in the variable delay element 4 can be set to 1.2 T.

Generally, if a pulse length of the modulated signal recorded on the CD are nT and nT bar, pulse lengths n'T and n'''T are given by: nT+nT=n'T+n''T. The delay time τ applied to the above-mentioned signal Sa by the variable delay element 4 is given by: τ=n'T−nT or τ=nT−n'''T. As described above, setting of the delay time τ to the variable delay element 4 can be determined by a difference between the pulse length of the output signal Sa from the comparator 2 and that of the modulated signal recorded on the CD corresponding the output signal.

As clearly described, the pulse length of the output signal Sa from the comparator 2 mentioned above changes with variation of the comparator reference voltage supplied to the comparator 2. Then, the comparator reference voltage is so selected as to generate the output signal Sa in the constantly stable condition from the comparator 2.

The above-mentioned AND circuit 3 outputs the logical-and-output signal between the output signal Sa from the comparator 2 and the output signal Sb from the variable delay element 4, that is, it produces the output signal Sc having pulse lengths 3 T and 3 T-bar as shown in FIG. 2 and sends it to the output terminal 7 as mentioned above and to the low-pass filter 5. The low-pass filter 5 extracts and supplies a low frequency component of the above-mentioned output signal Sc to the analog-to-digital converter 6.

The above-mentioned analog-to-digital converter 6 converts the supplied signal to a digital signal and supplies it to the variable delay element 4 as a delay control signal. The variable delay element 4 supplies, to the AND circuit 3, the output signal Sb whose delay time is controlled by the above-mentioned delay control signal. It is a matter of course that the analog-to-digital converter 6 mentioned above is unnecessary if the variable delay element 4 is of an analog type one.

By changing the delay time of the variable element 4 in accordance with change in the pulse length mentioned above, the above-mentioned variable delay element 4 prevents that the pulse length of the modulated signal slightly changes over a relative long interval between the scanning of the inner and the outer tracks.

As mentioned above, in the reproducing apparatus for reproducing plural types of optical information recording medium discs of the invention shown in FIG. 1, signal processing is carried out to obtain a good demodulated signal from the reproduced signal obtained by reproduction of the CD using the spot whose diameter is smaller than that projected onto a signal plane of the CD originally, in order to suitably reproduce the optical disc having a recording density which is higher than that of the CD. Thus, the reproducing apparatus of the invention is so structured as to demodulate a digital signal correctly by the special signal processing of the reproduced signal generated in a different optical reproducing condition from a specific optical reproduction condition specified for reproducing an optical disc to be reproduced by the optical head.

Figure 3:
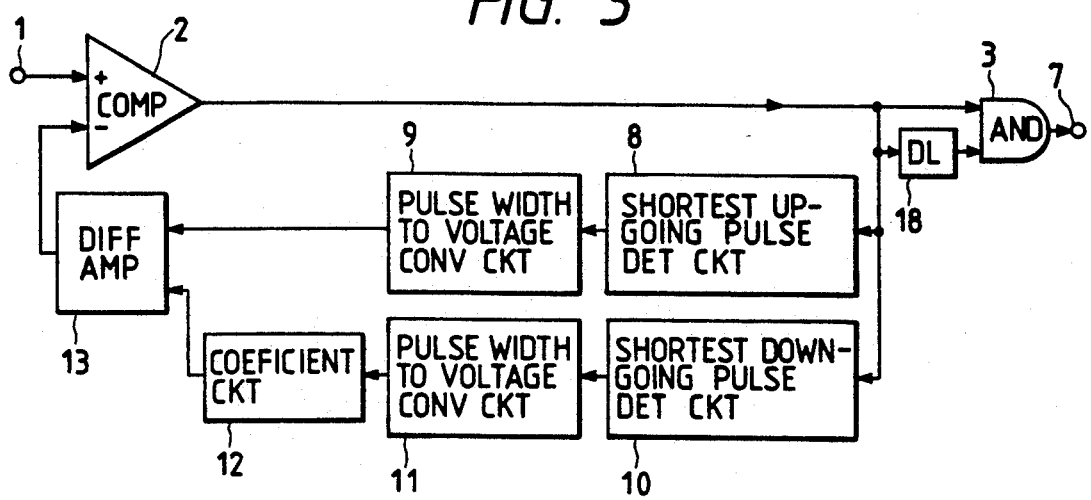
FIG. 3 is a block diagram of a second embodiment of the reproducing apparatus for reproducing plural types of optical information recording medium discs of the invention.

Hereinbelow will be described a second embodiment of the reproducing apparatus for reproducing plural types of optical information recording medium discs of the invention shown in FIG. 3. In FIG. 3, numeral 1 is the input terminal of the reproduced signal read out by optical head (not shown) from the optical information recording medium disc (optical disc). The reproduced signal of the optical disc, supplied to the input terminal 1 of the above-mentioned reproduced signal, as similar to the above-mentioned circuit arrangement shown in FIG. 1 is a reproduced signal from the CD for example, recording digital data modulated the above-mentioned EFM, as well as it is a reproduced signal reproduced by the optical head (not shown) projecting a spot whose diameter is smaller than that projected and focused onto a signal plane of the CD originally used, for example, a signal showing an eye pattern as shown in FIG. 5.

The reproduced signal supplied to the input terminal 1 from the not-shown optical head is applied to the non-inverting input terminal of the comparator 2. An inverting input terminal of the comparator 2 mentioned above is supplied with an output signal of the differential amplifier 13 as a comparator reference voltage. A comparing output signal from the comparator 2 is supplied to a shortest-up-going pulse detecting circuit 8 and a shortest down-going pulse detection circuit 10, the AND circuit 3, and a delay element 13.

The above-mentioned shortest-up-going pulse detection circuit 8 detects a pulse having the shortest pulse length out of up-going pulses in the comparing output signal outputted from the comparator 2 mentioned above and supplies to detected up-going pulse to a pulse width-voltage conversion circuit 9. The above-mentioned shortest-down-going pulse detection circuit 10 detects a pulse having the shortest pulse length out of down-going pulses in the comparing output signal outputted from the comparator 2 mentioned above and supplies the detected shortest-down-going pulse to a pulse width-voltage conversion circuit 11.

The above-mentioned pulse width-voltage converting circuits 9 and 11 generate a voltage corresponding to a pulse length of a pulse having a shortest pulse length in the signal supplied thereof. An output voltage from the pulse width-voltage converting circuit 9 is supplied to the differential amplifier 13. An output voltage from the pulse width-voltage converting circuit 11 is multiplied by K at a coefficient circuit 12 and supplied its output to the differential amplifier 13. An output signal from the differential amplifier 13 is supplied to the inverting input terminal of the comparator 2 as the comparing reference voltage as mentioned above.

Then, hereinbelow will be described structure and operation of the circuit arrangement shown in FIG. 3 on the condition that the reproduced signal supplied to the non-inverting input terminal of the comparator 2 from the input terminal 1 is a signal whose eye pattern is shown in FIG. 5, that is, on the condition that, when the signal recorded on the CD is a modulated signal of 3 T pulse length and 3 T-bar pulse length modulated signal which are continuous in the time base, the original consecutive signal of modulated signal of 3 T pulse length above-mentioned and the modulated signal of pulse length of 3 T-bar is changed into the reproduced signal shown in FIG. 5, that is, its pulse length is changed into lengths of the reproduced signal around a signal level (S—S in FIG. 5) of about half of the amplitude of the reproduced signal, namely, an interval of S1 to S2 (4.2 T) and an interval of S2 to S3 (1.8 T).

At the instance of start of operation of the circuit arrangement shown in FIG. 3, the comparator reference voltage supplied to the inverting input terminal of the comparator from the differential amplifier 13 is astable. The comparator 2 supplies the comparing output signal obtained as a comparing result of the reproduced signal shown in FIG. 5 by comparison with the comparator reference voltage supplied from the differential amplifier 13 at that instance and sends the comparing result to the shortest up-going pulse detection circuit 8 and the shortest down-going detection circuit 10, the AND circuit 3 and the delay element 18.

The shortest-up-going pulse detection circuit 8 and the shortest down-going pulse detection circuit 10 supplied with the comparing output signal mentioned above from the comparator 2 detects the shortest up-going and shortest down-going pulses from the comparing signal and sends outputs to the pulse width-voltage converting circuits 9 and 11 respectively.

The above-mentioned shortest up-going pulse detection circuit 8 and the shortest down-going pulse detection circuit 10 have structures such that for example, pulse length of up-going and down-going of sequential pulses in the comparing output signal supplied thereto is measured for a predetermined interval with clock pulses whose interval is shorter than 1 T and the pulse of the shortest pulse length detected during the interval can be detected.

When the reproduced signal supplied from the input terminal 1 to the comparator 2 is one showing the eye pattern shown in FIG. 5, it will be readily understood that the pulse length of the up-going pulse outputted from the comparator 2 from the reproduced signal is always longer than that of the down-going pulse though the comparator reference voltage supplied to the inverting terminal of the comparator 2 lies at any voltage.

Then, when a comparator reference voltage of the signal level shown by A—A in FIG. 5 is supplied to the comparator 2 to which the reproduced signal shown in FIG. 5 is applied, as mentioned above, the modulated signal of 3 T and 3 T-bar pulse lengths is outputted from the comparator 2. When the comparator reference voltage shown by the line S—S is supplied to the inverting input terminal of the comparator 2, as mentioned above, the demodulated signal is outputted as the comparing output signal having 4.2 T and 1.8 T pulse lengths. Therefore, the pulse length of the comparing output signal outputted from the comparator 2 is changed with variation of the voltage value of the comparator reference voltage supplied to the inverting input terminal of the comparator 2.

The comparator reference voltage value supplied to the inverter input terminal of the comparator 2 is determined so that pulse lengths of up-going pulses and down-going pulses in the comparing output signal outputted from the comparator 2 are different from pulse lengths (pulse length is 3 T in the example) of the up-going and down-going pulses in the regular comparing signal outputted from the comparator 2 by N times of channel bit (N is a natural number more than 1). Under this condition, the delay element 18 in the following pulse length correction circuit for setting a delay time of N times channel bit (N is a natural number more than 1) can be used. This is because the comparing output signal is always outputted from the comparator 2 such-that pulse lengths of up-going pulse and down-going pulse in the comparing output signal outputted from the comparator 2 are different from pulse lengths (pulse length is 3 T in the example) of the up-going and down-going pulses in the regular comparing signal outputted from the comparator 2 by N times of channel bit (N is a natural number more than 1). Therefore, this structure is more simple than the case that the variable delay 4 in the pulse length correction circuit is used whose delay time is for example, 1.2 T which has a fraction.

Then, in the circuit arrangement shown in FIG. 3, the comparator reference voltage supplied to the inverting input terminal of the comparator 2 is obtained by a feedback circuit having a feedback line provided between the output of the comparator 2 and the inverting input terminal of the comparator 2. Therefore, it is necessary to obtain the comparator reference voltage such that the comparing output signal is always outputted from the comparator 2 including pulse lengths of the up-going pulse and the down-going pulse in the comparing output signal outputted from the comparator 2 which are different from pulse lengths (pulse length is 3 T in the example) of the up-going and down-going pulses in the regular comparing signal outputted from the comparator 2 by an interval of N times channel bit (N is a natural number more than 1) by the feedback circuit having a feedback line provided between the output of the comparator 2 and the inverting input terminal of the comparator 2. At first, as to the reproduced signal shown in FIG. 5, a range of the comparator reference voltage is determined such that pulse lengths of up-going and down-going pulses in the comparing output signal outputted from the comparator 2 are obtained stable and then the shortest up-going pulse of the given pulse length (or the shortest down-going pulse of the given pulse length) within the range is determined.

In the case that the reproduced signal supplied from the input terminal 1 to the comparator 2 is one showing the eye pattern shown in FIG. 5; and that the demodulated signal can be obtained stable from the comparator 2 such that the length of the shortest up-going pulse in the output comparing signal outputted from the comparator 2 is 4 T, by the comparator reference voltage supplied to the inverting input terminal of the comparator 2 from the differential amplifier 13 in the feedback line provided between the output of the comparator mentioned above and the inverting input terminal of the comparator 2, the coefficient K of the coefficient circuit provided in the feedback line mentioned above can be so set that the length of the shortest up-going pulse in the output comparing signal outputted from the comparator 2 is always 4 T.

In the above-mentioned example, the coefficient K of the coefficient circuit 12 to be set is given by: K=(the pulse length of the shortest up-going pulse 4 T)÷(the pulse length of the shortest down-going pulse 2 T)=2.

The pulse length correction circuit comprising a 1 T delay element 18 and the AND circuit 3 for converting the up-going pulse of 4 T and the down-going pulse of 2 T-bar outputted from the above-mentioned comparator 2 into the up-going pulse of 3 T and the down-going pulse of 3 T-bar. It can be clearly understood that the stably obtained demodulated signal, that is, the output comparing signal output outputted from the comparator 2 mentioned above including the up-going pulse of 4 T and the down-going pulse of 2 T-bar, can be corrected (converted) to the up-going pulse of 3 T and the down-going pulse of 3 T-bar by the pulse length correction circuit comprising the 1 T delay element 18 and the AND circuit 3 from the description about operation of the pulse length correction circuit shown in FIG. 1 with reference to the waveforms shown in FIG. 2. It is a matter of course that the output signal whose pulse length is other than 3 T can be obtained in a good condition also.

Figure 4:
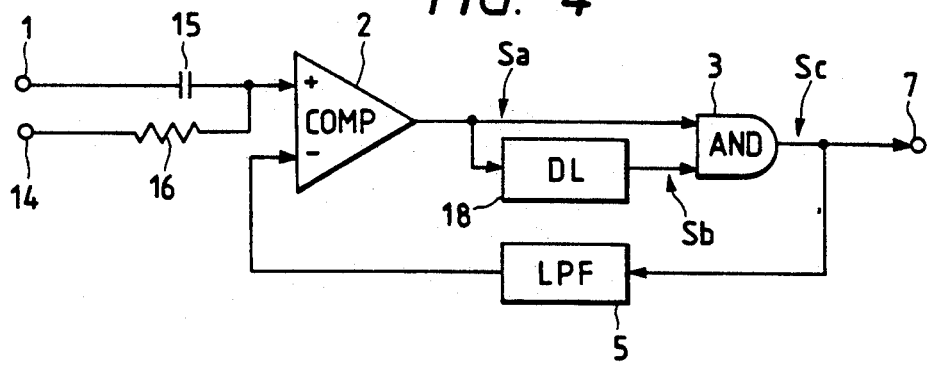
FIG. 4 is a third embodiment of the reproducing apparatus for reproducing plural types of optical information recording disc of the invention.

Hereinbelow will be described a third embodiment of the reproducing apparatus for reproducing plural types of optical information recording disc of the invention shown in FIG. 4. In FIG. 4, the reproduced signal supplied from the optical head (not shown) is inputted to the non-inverting input terminal of the comparator 2 with dc components cut off by a capacitor 15. The non-inverting input terminal of the above-mentioned comparator 2 is also supplied with a given voltage through a resistor 16. The given constant voltage supplied to the input terminal 14 is a constant dc voltage of 2.5 volts if a digital signal outputted from the comparator 2 is of a logic low level of 0 volt or a logic high level of 5 volts. The inverting input terminal of the comparator 2 is supplied with an output of a low-pass filter 5.

A comparing output signal Sa outputted from the above-mentioned comparator 2 is supplied to the AND circuit 3 and to a delay element 18. An output signal Sb from the above-mentioned delay element 18 is supplied to the AND circuit 3. The output signal Sb from the above-mentioned delay element 18 is sent to the AND circuit 3. An output signal Sc from the AND circuit 3 is sent to the output terminal 7 and to the low-pass filter 5 mentioned above. The low-pass filter 5 supplies low-frequency component of the output signal Sc of the above-mentioned AND circuit 3 to the inverting input terminal of the comparator 2.

Hereinbelow will be described structure and operation of the circuit arrangement shown in FIG. 4 on the condition that the reproduced signal supplied to the non-inverting input terminal of the comparator 2 from the input terminal 1 through the capacitor 15 is a signal whose eye pattern is shown in FIG. 5, that is, on the condition that, when the signal recorded on the CD is a modulated signal of 3 T pulse length and 3 T-bar pulse length modulated signal which are continuous in the time base, the original consecutive signal of modulated signal of 3 T pulse length above-mentioned and the modulated signal of pulse length of 3 T-bar is changed into the reproduced signal shown in FIG. 5, that is, its pulse length is changed into lengths of the reproduced signal around a signal level (S—S in FIG. 5) of about half of the amplitude of the reproduced signal, namely, an interval of S1 to S2 (4.2 T) and an interval of S2 to S3 (1.8 T).

At the instance that the circuit arrangement shown in FIG. 4 starts its operation, though the comparator reference voltage supplied to the inverting input terminal of the comparator 2 from the low-pass filter 5 is not determined, the comparator 2 supplies the comparing output signals Sa obtained as a comparing result with respect to the reproduced signal shown in FIG. 5 with reference to the comparator reference voltage supplied from the low-pass filter 5 as that instance and sends it to the pulse length correction circuit comprising the AND circuit 3 and the delay element 18.

The above-mentioned AND circuit 3 outputs a signal Sc of logic-and between the comparing output signal Sa outputted from the comparator 2 and the signal Sb outputted from the delay element 18. The delay time can be determined as similar to the above-mentioned embodiment of FIG. 3.

In the embodiment shown in FIG. 4, the dc components of the output signal Sc outputted at the output terminal 7 from the AND circuit 3 in the pulse length correction circuit is supplied to the inverting input terminal of the comparator 2 as a comparing reference voltage.

Then, if the delay time of the delay element 18 in the pulse length correction circuit is set to for example, 1 T, the comparator reference voltage supplied to the non-inverting input of the comparator 2 mentioned above is automatically controlled so that the output comparing signal outputted from the above-mentioned comparator 2 has always the shortest up-going pulse of pulse length 4 T and the shortest down-going pulse of pulse length 2 T by operation of a loop starting from the comparator 2, through the pulse length correction circuit comprising the delay element 18 and AND circuit 3, the low-pass filter 5, and returning to the comparator 2.

The pulse length correction circuit comprising the 1 T delay element 18 and the AND circuit 3 converts the up-going pulse of pulse length 4 T and down-going pulse of pulse length 2 T-bar into the up-going pulse of pulse length 3 T and down-going pulse of pulse length 3 T-bar and sends them to the output terminal 7. It is a matter of course that a signal whose pulse length is other than 3 T can be obtained in a good condition as an output signal.

The circuit arrangements shown in FIGS. 1, 3, and 4 include a feedback circuit respectively. The detailed description about design in gain characteristic and phase characteristic, etc., of the feedback circuit is omitted because they are generally known.

In each embodiment of the reproducing apparatus for reproducing plural types of the optical information recording medium discs of the invention described with reference to FIGS. 1, 3 and 4, the demodulated signal outputted from the comparator, whose pulse length is not a regular is corrected (converted) to another demodulation signal of the regular pulse length by the pulse length correction circuit.

The reproducing apparatus for reproducing plural types of optical information recording medium discs of the invention can be also built up with a digital demodulating conversion table whose conversion is such that conversion data is shifted by D (D is a positive real number) channel bits compared with the digital demodulating conversion table provided to the conventional reproducing apparatus of the CD, when the pulse length of the comparing output signal is deviated by D (D is a positive real number) channel bits from that of the comparing output signal outputted from the comparator in the case that the reproduced signal is digitized using the comparator reference voltage determined by the above-mentioned first reproducing reference, wherein the reproduce signal is obtained by the reproducing of the CD through an optical reproduction condition for the optical disc whose recording density is higher than the CD.

The reproducing apparatus for reproducing plural types of the optical information recording medium discs of the invention having the above-mentioned structure, can provide a final demodulation digital data from the digital demodulation table by applying data obtained from the comparing output signal outputted from the comparator 2 to the digital demodulation table directly without use of the pulse length correction circuit provided to the above-mentioned optical information recording medium disc of FIGS. 1, 3, and 4.

In each embodiment of the reproducing apparatus for reproducing plural types of the optical information recording medium discs of the invention of FIGS. 1, 3, and 4, the demodulated signal 1 including irregular pulse outputted from the comparator 2 is corrected (converted) into another demodulation signal having the regular pulse length by the pulse length correction circuit and then the converted data is applied to a digital demodulation table and then, the final demodulated digital data is obtained from the digital demodulation conversion table. However, structure of the reproducing apparatus for reproducing plural types of the optical information recording medium discs can be simplified in structure as follows:

The digital demodulation conversion table having been used for final demodulation of the digital signal in the CD reproducing apparatus includes the function of the pulse correction circuit used in each embodiment of the reproducing apparatus for reproducing plural types of the optical information recording medium discs of the invention shown in FIGS. 1, 3, and 4, so that final demodulated digital data can be directly obtained from the demodulated signal having irregular pulse length pulses outputted from the comparator 2.

As described in detail above, the reproducing apparatus for reproducing plural types of the optical information recording medium discs of the invention provides a good demodulation signal readily as follows:

A digital signal is generated by comparing the reproduced signal by comparator to which a comparator reference voltage is applied, the comparator reference voltage being is different from that determined by a first reproducing reference, the reproduced signal being obtained by reproducing an optical information recording medium disc, having lower recording density, to be reproduced under the first reproducing reference under a second optical reproducing condition which is applied to reproduction of another optical information recording medium disc having a recording density higher than the optical information recording medium disc which is to be reproduced under the first reproducing reference.

A pulse length of a digital signal generated as mentioned above is so corrected to have a regular pulse length of the digital signal by the pulse length correction means because the pulse length of the reproduce signal reproduced under the first reproducing reference mentioned above is different from another pulse length which would be obtained by digitizing the regular reproduced signal using the comparator reference voltage determined by the first reproducing reference.

Moreover, in the case that the digital signal is obtained by application of the reproduced signal obtained by reproduction of an optical disc having a lower recording density under a second reproducing condition which is applied to reproduction of another optical disc having a recording density higher than that of the above-mentioned optical information recording medium disc which is to be reproduced under the first reproducing reference, a digital signal of regular pulse length is outputted from the comparator by feeding back the digital signal outputted at the comparator through the pulse length correction circuit and the feedback circuit as a comparator reference voltage of the comparator so that a pulse length of the reproduced signal obtained by reproducing under the first reproducing reference of the optical disc to be reproduced under the first reproducing reference is the same as a pulse length of the digital signal obtained by digitizing using the comparator reference voltage determined by the above-mentioned first reproducing reference.

Further, a digital signal is generated by comparing the reproduced signal with a comparator reference voltage which is different from that determined by a first reproducing reference, the reproduced signal being obtained by reproducing an optical information recording medium disc, having lower recording density, to be reproduced under the first reproducing reference under a second optical reproducing condition which is applied to reproduction of another optical information recording medium disc having a recording density higher than the optical information recording medium disc which is to be reproduced under the first reproducing reference.

Moreover, a digital signal is generated by comparing the reproduced signal by comparator to which a comparator reference voltage is applied, the comparator reference voltage being is different from that determined by a first reproducing reference, the reproduced signal being obtained by reproducing an optical information recording medium disc, having lower recording density, to be reproduced under the first reproducing reference under a second optical reproducing condition which is applied to reproduction of another optical information recording medium disc having a recording density higher than the optical information recording medium disc which is to be reproduced under the first reproducing reference.

In the case that a pulse length of a digital signal generated as mentioned above is shifted by D (D is a positive real number) channel bits compared with a regular digital signal which would be obtained by the comparator to which the comparator reference voltage determined by the first reproducing reference and the reproduced signals being obtained by reproducing of the optical disc to be reproduced under the first reproducing reference under the first reproducing reference, the digital signal is converted by the digital demodulation converting table whose conversion condition -is such that the pulse length of the digital signal is shifted by D (D is a positive real number) channel bits compared with a conversion condition of a digital demodulation conversion table provided to the reproducing apparatus of the optical disc.

Therefore, formerly, in a conventional reproducing apparatus for correctly reproducing and demodulating the information signal recorded in a plural different optical discs whose recording densities are different from each other, the reproducing apparatus requires different sets of one or both of a light source of a reproducing light and a condenser lens used in the reproducing apparatus. That is, different structures where light sources emitting different wavelength light and different condenser lens having different numerical apertures were required. On the other hand, in this invention, there are no requirements mentioned above. Thus, in the reproducing apparatus used for reproducing recorded information on each of optical discs whose recording densities are different from each other, this invention enables a reproducing apparatus used for an optical disc for which a diameter of a spot for reproducing light projected on the optical disc in focus on reproducing mode is specified to be used also for reproduction of other optical disc to be reproduced in the reproducing apparatus. Therefore, according to this invention, all problems of the prior art can be suitably resolved.

What is claimed is:

1. A reproducing apparatus for reproducing signals from plural types of discs by utilizing a digital signal generating circuit, comprising:
    digital signal generation means for generating a digital signal having a first pulse length by digitizing a reproduced signal obtained from an optical information recording medium having a first optical recording density corresponding to a first reference signal,
    said digital signal generation means further generating said digital signal with a second pulse length by digitizing a reproduced signal obtained from an optical information recording medium having a second optical recording density higher than said first optical recording density by,
    said digital signal generation means comprising a comparator for comparing a reproduced signal inputted thereto with a reference signal,
    said digital signal generation means generating said digital signal with said second pulse length in response to inputting to said comparator a second reference signal different from said first reference signal; and
    pulse length correction means responsive to reception by said comparator of said first reference signal by correcting a pulse length of a digital signal outputted from said digital signal generation means and for setting said pulse length of said digital signal to equal said first pulse length.

2. A reproducing apparatus for a reproduced signal from plural types of discs, comprising:
    comparing means having a first terminal supplied with the reproduced signal and a second terminal supplied with a reference voltage, said first terminal connected to an optical pickup for receiving therefrom a first reproduced signal from a first disc recorded at a first recording density and a second reproduced signal from a second disc recorded at a second recording density higher than said first recording density,
    said optical pickup having a structure structured for reading data from the second disc for reproduction of a signal recorded on the second disc and for producing the second reproduced signal,
    said second terminal being supplied with a reference voltage suited for reproduction of signals from said second disc; and
    pulse length compensation means for changing a pulse length of a digital signal from said comparing means by a predetermined value, said predetermined value corresponding to a difference between a pulse length of said digital signal from said comparing means and a pulse length obtained by comparing said reproduced signal with a reference voltage suited for the reproduction of the reproduced signal from said first disc.

3. A reproducing apparatus for a reproduced signal from plural types of discs, comprising:
    comparing means having a first terminal supplied with the reproduced signal and a second terminal supplied with a reference voltage for outputting a digital signal, said first terminal connected to an optical pickup for receiving therefrom a first reproduced signal from a first disc recorded at a first recording density,
    said optical pickup having a structure corresponding to a second disc recorded at a second recording density higher than said first recording density for reproduction of a signal recorded on the second disc and for producing a second reproduced signal,
    feedback means for generating first and second voltage values obtained by converting a pulse length of a shortest up-going pulse and a shortest down-going pulse of said digital signal from said comparing means into respective voltages and for supplying said reference voltages as a difference voltage between said first and second voltage values, one of said first or second voltage value being multiplied by a coefficient, said feedback means controlling said comparing means such that said comparing means outputs a digital signal and such that said pulse lengths of the shortest up-going pulse differs from said shortest down-going pulse by N channel bits where N is a natural number greater than 0; and pulse length compensation means for changing a pulse length of said digital signal from said comparing means by N channel bits.

4. A reproducing apparatus for a reproduced signal from plural types of discs, comprising:

comparing means having a first terminal supplied with the reproduced signal and a second terminal supplied with a reference voltage for outputting a digital signal, said first terminal connected to an optical pickup for receiving therefrom a first reproduced signal from a first disc recorded at a first recording density, said optical pickup having a structure corresponding to a second disc recorded at a second recording density higher than said first recording density for reproduction of a signal recorded on the second disc and for producing a second reproduced signal, pulse length compensation means for changing a pulse length of said digital signal from said comparing means by N channel bits where N is a natural number greater than 0; and feedback means for extracting a dc component of an output from said pulse length compensation means and for supplying the extracted dc component to said second terminal of said comparing means as said reference voltage, said feedback means performing control such that a shortest up-going pulse and a shortest down-going pulse of said output from said pulse length compensation means have a same pulse length.

* * * * *